Patented Apr. 17, 1934

1,954,939

UNITED STATES PATENT OFFICE 1,954,939

MOTOR FUEL

Laurance F. Magness, Baltimore, Md.

No Drawing. Application January 12, 1920, Serial No. 350,977

3 Claims. (Cl. 44—9)

My invention relates to a new fluid fuel which is adapted for use in any and all types of internal combustion motors.

Fuels composed solely of benzol and petroleum distillate have the disadvantage that in the normal operation of the engine a considerable amount of "wet carbon" is deposited. Attempts to overcome this disadvantage have been made by adding to the fuel special substances. By using a type of distillate substantially as hereinafter specified, it is found that it contains a sufficient amount of toluol in addition to benzol, that when mixed with petroleum distillate a great diminution in the amount of carbon deposit occurs compared with a similar fuel without toluol.

Although the use of benzol in gasoline diminishes the spark knock, the addition of toluol still further diminishes it.

The advantages of this fuel are that it will not cause oxidation of the metal tanks or containers, such as are used for supply tanks for engines, and also will not cause a sediment to form and prevent the flow of the fuel. My fuel will stand a high compression and will prevent spark knock and preignition in motors, and due to the particular blend will carburet more readily and permit of quick starting in cold weather. My fuel can be used in engines which are equipped with carbureters having shellac floats without damaging the float. My fuel will give greater mileage and power, due to its thermal value being greater per gallon of fuel, and does not permit carbon to deposit in the motor as quickly as the ordinary fuels.

My fuel is composed preferably of fifty per cent of a distillate of the light oils of bituminous coal taken from the first drop at from 77 to 78 degrees centigrade and the dry point at 135 degrees centigrade. This distillate is composed approximately of 88 per cent of 90 degree water white benzol and 12 per cent of water white toluol. It will of course be understood that the composition of the light oils of bituminous coal vary with the character of the coal being treated and that therefore the character of the distillate, will change correspondingly, but the distillate will in all instances contain benzol as the principal ingredient and a relatively smaller proportion of toluol, altho small proportions of other ingredients may be present. The remaining fifty per cent of my fuel is composed of gasoline.

Gasolene as now found on the market is a mixture of petroleum hydrocarbons, having an initial boiling point of from 70 to 140 degrees F., an end boiling point of from 360 to 450 degrees F., gravity of 50 to 61 degrees Bé., a sweet to oily aroma, a water white color, specific heat of 0.50, and heat of vaporization of 130 B. t. u. per pound.

The particular hydrocarbons composing it belong to a general group known as the paraffins. Other types of hydrocarbons are occasionally present in a very small amount.

In using the word gasolene in the specification and claims I have reference to a product falling within the herein above definition.

The most advantageous method of blending these ingredients is to mix them thoroughly either by air agitation or by pouring in or causing to flow in at the same instant, suitable quantities of each into a mixing tank.

The percentages of ingredients may be changed also to correspond to weather conditions due to the fact that benzol freezes at approximately 32 degrees F. The percentage of the benzol-toluol in the mixture may vary from forty to sixty per cent in the fuel. If it is desired to increase the volatility of the mixture, suitable proportions of naphtha may be added thereto.

While I have described my invention above in detail, I wish it to be understood that many changes may be made therein without departing from the spirit thereof.

I claim

1. A motor fuel composed of approximately fifty percent of gasoline and fifty percent of the distillates of the light oils of bituminous coal containing principally benzol and toluol.

2. A motor fuel composed of major quantities of gasoline and benzol and containing a minor quantity of toluol.

3. A motor fuel, the major portion of which is gasoline, containing a minor portion of benzol and a still smaller quantity of toluol.

LAURANCE F. MAGNESS.

DISCLAIMER 1,954,939.—*Laurance F. Magness*, Baltimore, Md. MOTOR FUELS. Patent dated April 17, 1934. Disclaimer filed October 20, 1938, by the assignee, *The American Oil Company.*

Hereby enters this disclaimer to and of claims 1, 2, and 3 in said specification.
[*Official Gazette November 15, 1938.*]

Patented Apr. 17, 1934

1,954,939

UNITED STATES PATENT OFFICE 1,954,939

MOTOR FUEL

Laurance F. Magness, Baltimore, Md.

No Drawing. Application January 12, 1920,
Serial No. 350,977

3 Claims. (Cl. 44—9)

My invention relates to a new fluid fuel which is adapted for use in any and all types of internal combustion motors.

Fuels composed solely of benzol and petroleum distillate have the disadvantage that in the normal operation of the engine a considerable amount of "wet carbon" is deposited. Attempts to overcome this disadvantage have been made by adding to the fuel special substances. By using a type of distillate substantially as hereinafter specified, it is found that it contains a sufficient amount of toluol in addition to benzol, that when mixed with petroleum distillate a great diminution in the amount of carbon deposit occurs compared with a similar fuel without toluol.

Although the use of benzol in gasoline diminishes the spark knock, the addition of toluol still further diminishes it.

The advantages of this fuel are that it will not cause oxidation of the metal tanks or containers, such as are used for supply tanks for engines, and also will not cause a sediment to form and prevent the flow of the fuel. My fuel will stand a high compression and will prevent spark knock and preignition in motors, and due to the particular blend will carburet more readily and permit of quick starting in cold weather. My fuel can be used in engines which are equipped with carbureters having shellac floats without damaging the float. My fuel will give greater mileage and power, due to its thermal value being greater per gallon of fuel, and does not permit carbon to deposit in the motor as quickly as the ordinary fuels.

My fuel is composed preferably of fifty per cent of a distillate of the light oils of bituminous coal taken from the first drop at from 77 to 78 degrees centigrade and the dry point at 135 degrees centigrade. This distillate is composed approximately of 88 per cent of 90 degree water white benzol and 12 per cent of water white toluol. It will of course be understood that the composition of the light oils of bituminous coal vary with the character of the coal being treated and that therefore the character of the distillate, will change correspondingly, but the distillate will in all instances contain benzol as the principal ingredient and a relatively smaller proportion of toluol, altho small proportions of other ingredients may be present. The remaining fifty per cent of my fuel is composed of gasoline.

Gasolene as now found on the market is a mixture of petroleum hydrocarbons, having an initial boiling point of from 70 to 140 degrees F., an end boiling point of from 360 to 450 degrees F., gravity of 50 to 61 degrees Bé., a sweet to oily aroma, a water white color, specific heat of 0.50, and heat of vaporization of 130 B. t. u. per pound.

The particular hydrocarbons composing it belong to a general group known as the paraffins. Other types of hydrocarbons are occasionally present in a very small amount.

In using the word gasolene in the specification and claims I have reference to a product falling within the herein above definition.

The most advantageous method of blending these ingredients is to mix them thoroughly either by air agitation or by pouring in or causing to flow in at the same instant, suitable quantities of each into a mixing tank.

The percentages of ingredients may be changed also to correspond to weather conditions due to the fact that benzol freezes at approximately 32 degrees F. The percentage of the benzol-toluol in the mixture may vary from forty to sixty per cent in the fuel. If it is desired to increase the volatility of the mixture, suitable proportions of naphtha may be added thereto.

While I have described my invention above in detail, I wish it to be understood that many changes may be made therein without departing from the spirit thereof.

I claim

1. A motor fuel composed of approximately fifty percent of gasoline and fifty percent of the distillates of the light oils of bituminous coal containing principally benzol and toluol.

2. A motor fuel composed of major quantities of gasoline and benzol and containing a minor quantity of toluol.

3. A motor fuel, the major portion of which is gasoline, containing a minor portion of benzol and a still smaller quantity of toluol.

LAURANCE F. MAGNESS.

DISCLAIMER 1,954,939.—*Laurance F. Magness*, Baltimore, Md. MOTOR FUELS. Patent dated April 17, 1934. Disclaimer filed October 20, 1938, by the assignee, *The American Oil Company*.

Hereby enters this disclaimer to and of claims 1, 2, and 3 in said specification.

[*Official Gazette November 15, 1938.*]